United States Patent
Kryukov et al.

(10) Patent No.: US 9,703,533 B2
(45) Date of Patent: Jul. 11, 2017

(54) APPLICATION PLATFORM FOR DESIGNING AND EXECUTING APPLICATIONS

(75) Inventors: Evgeny Kryukov, Ulan-Ude (RU); Michael L. Swindell, Aptos, CA (US); John Ray Thomas, Aptos, CA (US)

(73) Assignee: Embarcadero Technologies, Inc., Austin, TX (US)

( * ) Notice: Subject to any disclaimer, the term of this patent is extended or adjusted under 35 U.S.C. 154(b) by 58 days.

(21) Appl. No.: 13/600,100

(22) Filed: Aug. 30, 2012

(65) Prior Publication Data
US 2013/0055199 A1 Feb. 28, 2013

Related U.S. Application Data

(60) Provisional application No. 61/529,208, filed on Aug. 30, 2011, provisional application No. 61/529,210, filed on Aug. 30, 2011.

(51) Int. Cl.
*G06F 9/44* (2006.01)
*G06F 9/445* (2006.01)

(52) U.S. Cl.
CPC ............ *G06F 8/34* (2013.01); *G06F 8/20* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 5,335,320 A * | 8/1994 | Iwata et al. ................... | 717/110 |
| 5,774,728 A * | 6/1998 | Breslau ..................... | G06F 8/47 |
| | | | 717/141 |
| 5,862,379 A * | 1/1999 | Rubin et al. .................. | 717/109 |
| 6,877,155 B1 * | 4/2005 | Lindsey ....................... | 717/108 |
| 7,665,062 B1 * | 2/2010 | Bauer et al. .................. | 717/108 |
| 8,229,984 B2 | 7/2012 | Khader et al. | |
| 8,615,747 B2 | 12/2013 | Beretta | |
| 8,656,430 B2 | 2/2014 | Doyle et al. | |
| 2002/0016953 A1 * | 2/2002 | Sollich ............................. | 717/1 |
| 2008/0005683 A1 * | 1/2008 | Aoki ............................. | 715/763 |
| 2008/0263529 A1 * | 10/2008 | Beretta ........................ | 717/151 |

(Continued)

OTHER PUBLICATIONS

Borland International Inc, "Visual Component Library Reference for Borland Delphi", Copyright 1995.*

(Continued)

*Primary Examiner* — H S Sough
*Assistant Examiner* — Timothy Duncan

(57) ABSTRACT

A computer-usable storage medium having instructions embodied therein that when executed cause a computer system to perform a method for using an application platform for designing an application. An interface for developing an application is provided at a computer system. A plurality of components are provided at the interface for use in visually designing the application. A selection of a component from the plurality of components is received at the interface. A placement of the component in the application is received within the interface. The application is compiled with the component and the placement of the component such that the application executes natively on a target processor, and wherein the application is bound directly to a native graphics library associated with the target processor.

19 Claims, 5 Drawing Sheets

(56) References Cited

U.S. PATENT DOCUMENTS

2009/0313004 A1* 12/2009 Levi et al. ............... 703/28
2011/0023016 A1* 1/2011 Khader et al. ............. 717/120
2012/0096445 A1* 4/2012 Berg ............... G06F 9/44547
    717/140
2012/0272224 A1* 10/2012 Brackman ......... G06F 9/44521
    717/151
2013/0019266 A1* 1/2013 Doyle ............. H04N 21/42209
    725/47

OTHER PUBLICATIONS

Borland International Inc, "Developers Guide for Borland Delphi 7 for Windows", Copyright 1983-2002.*

* cited by examiner

PROCESS 500

```
APPLICATION IS RECEIVED AT A DEVICE DESIGNED TO EXECUTE
NATIVELY AT A PROCESSOR ASSOCIATED WITH THE DEVICE WHEREIN
THE APPLICATION WAS DESIGNED IN AN INTERFACE WITH AT LEAST
ONE COMPONENT OF THE APPLICATION SELECTED FROM A PLURALITY
OF COMPONENTS AT THE INTERFACE
502
```

```
THE APPLICATION IS EXECUTED AT THE DEVICE
504
```

```
AT LEAST PARTIALLY RENDERING A FEATURE OF THE APPLICATION
DURING THE EXECUTION THE APPLICATION
506
```

FIG. 5

APPLICATION PLATFORM FOR DESIGNING AND EXECUTING APPLICATIONS

RELATED APPLICATION

This application claims priority to and benefit of the U.S. Provisional Patent Application 61/529,208, entitled "SYSTEMS AND METHODS FOR DESIGNING AN APPLICATION" with the filing date of Aug. 30, 2011, by John Thomas et al., assigned to the assignee of the present application, and which is herein incorporated by reference in its entirety.

This application additionally claims priority to and benefit of the U.S. Provisional Patent Application 61/529,210, entitled "SYSTEMS AND METHOD FOR RUNNING AN APPLICATION" with the filing date of Aug. 30, 2011, by John Thomas et al., assigned to the assignee of the present application, and which is herein incorporated by reference in its entirety.

FIELD OF THE TECHNOLOGY

The present technology relates generally to a application platform for designing and executing applications.

BACKGROUND

A variety of modern electronic devices have the ability to execute software applications. There is an increasing market to design software applications or apps. Different electronic devices, such as computer systems and handheld devices, employ different platforms or operating systems for executing software applications. Developers are faced with increasing challengers for designing and developing software applications that will effectively run or execute across a variety platforms. One solution is to have each device install and execute a virtual software layer that is common to a majority of electronic devices. A software application may then be designed to execute using the virtual software layer.

BRIEF DESCRIPTION OF DRAWINGS

FIG. 5 illustrates a flowchart of an example method for executing an application, in accordance with embodiments of the present technology.

Figure 1:
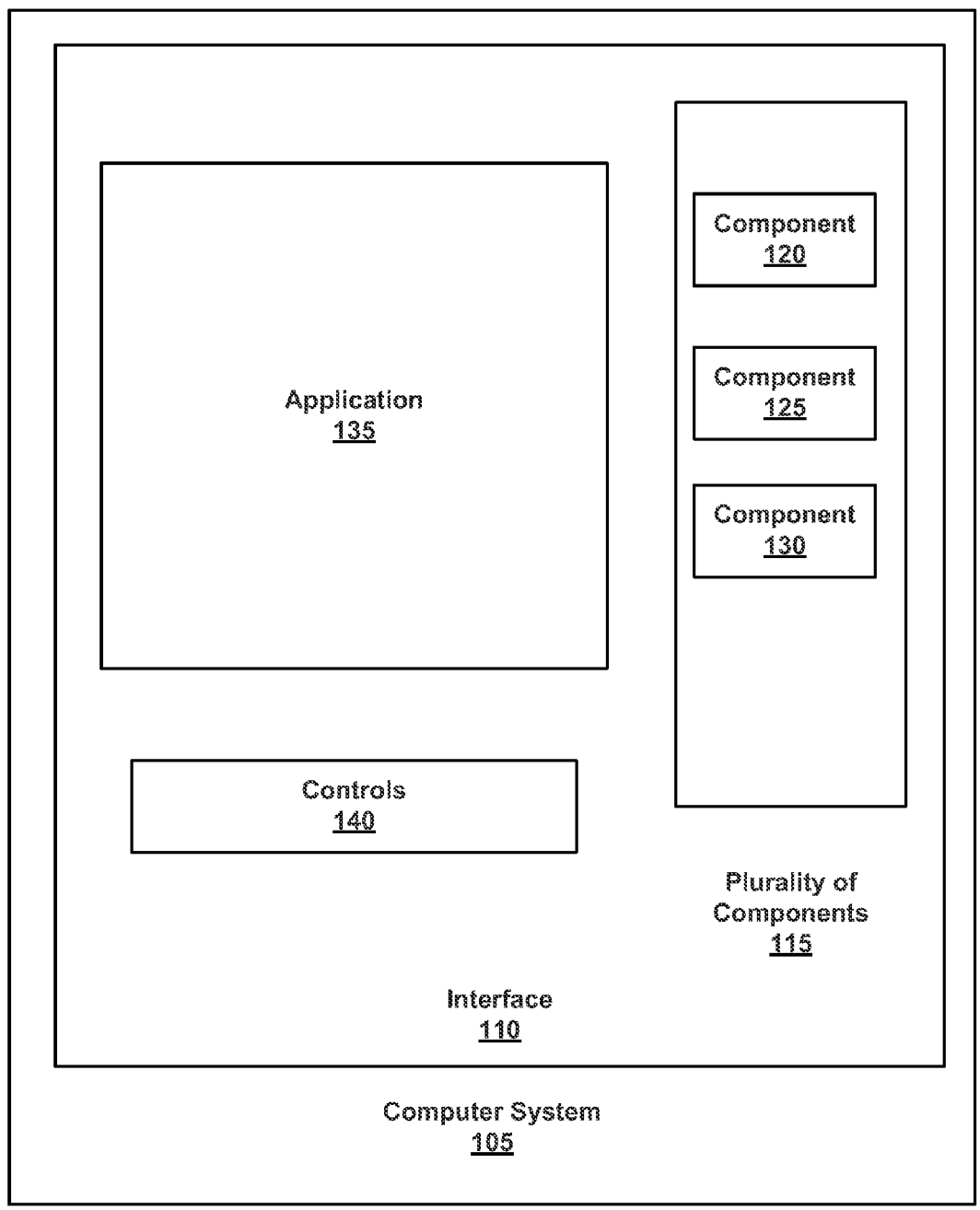
FIG. 1 is a block diagram of an environment employing an application platform for designing an application in accordance with embodiments of the present technology.

The drawings referred to in this description of embodiments should be understood as not being drawn to scale except if specifically noted.

DETAILED DESCRIPTION OF INVENTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, user interface controls, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "providing," "receiving," "compiling," "adjusting," "deploying," "adding," "changing," "executing," or the like, refer to the actions and processes of a computer system, or similar electronic computing device. The computer system or similar electronic computing device, such as a smart phone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of an Application Platform for Designing and Executing an Application Embodiments of the present technology are for designing and executing an application using an application platform. The application platform may be described as an application framework which employs a visual interface for designing or developing an application. The application platform provides a plurality of components to be employed in designing or developing the application as well as tools for manipulating the components of the application. The application platform may be used as a system or in a method for creating a native running application with a rich user interface for multiple platforms. In one embodiment, the application platform provides an interface that allows a developer to click and place components into position for placement within the application user interface. For example, a predefined visual object may be provided by the application platform and is selected by a developer. The predefined visual object may then be positioned by the developer by clicking and placing the predefined visual object into a space that will operate as a button in the application once designed. Components may include a predefined visual object, an object, a graphic, text, a text field, an effect, a button, an animation, and a user interface control.

In one embodiment, the application platform may partially compile the application and execute the application with limited functionality within the application platform design tool while the application is being designed. This feature allows a developer to partially experience the application and receive feedback regarding the layout and basic functionality of the application before the application is fully designed. Thus the developer may make adjustments or alterations based on the partially compiled application executing with limited functionality. The application may also be executed with limited functionality at different stages of development without requiring the code to be fully compiled into an executable binary. In one embodiment, the application, or features of the application, may be rendered at execution.

The application platform is able to compile the code native to a target processor and operating system that will execute the application. In one embodiment, there is no virtual software layer or runtime interpreter employed by the target processor to execute the application. In other words, plain compiled code is employed which is faster to execute than an implementation employing a virtual software layer. The application platform may also be able to create a plurality of versions of the application, each version designed specifically for a different operating system or computing platform. Thus the application may be recompiled for several operating systems and platforms allowing the developers to easily create cross platform applications.

In one embodiment, there is no library to deploy or install when executing an application designed by via the application platform. For example, the application platform may be compiled into the actual application, making it easy to deliver the application on end-users computers and devices as one executable binary file. In one embodiment, a library required by the application may be included in the application such as a static library that loads with the application each time the application is executed, thus there is no requirement to deploy or install any library in addition to the application itself. In one embodiment, the application includes a dynamic library where portions of the library are loaded as needed during the execution of the application. The application platform can use native graphic libraries to abstract from the underlying operating system. In one embodiment, the application platform can be adapted to different Graphical Processing Unit (GPU) libraries, such as DirectX and OpenGL, and it could be ported to many different operating systems. Thus, the application platform employs existing libraries to execute and may not require an additional library to be installed.

The present technology provides for many examples of an application platform for designing and executing an application. The following discussion will demonstrate various hardware, software, and firmware that are used with and in computer systems and other user devices for using an application platform for designing and executing an application in various embodiments of the present technology. Furthermore, the systems, platforms, and methods may include some, all, or none of the hardware, software, and firmware discussed below.

An Application Platform for Designing and Executing an Application

Referring to the figures, exemplary embodiments of the technology will now be described. The following description will focus on an embodiment of the present technology, which is an application platform for designing and executing an application. The present technology, however, is not limited to any one particular device, operating system, environment, or platform. Instead, those skilled in the art will find that the system and methods of the present technology may be advantageously embodied on a variety of different platforms, including Microsoft Windows, iOS, Android, Macintosh, Linux, Solaris, UNIX, FreeBSD, and the like. Therefore, the description of the exemplary embodiments that follows is for purposes of illustration and not limitation.

FIG. 1 is a block diagram illustrating environment 100 which is an example environment comprising computer system 105, interface 110, plurality of components 115, components 120, 125, and 130, application 135, and controls 140 in accordance with embodiments of the present technology. Environment 100 depicts computer system 105 as a hardware device for carrying out the present technology. Computer system 105 may be a general purpose computer system, an embedded computer system, a personal computer such as a desktop computer, a laptop, a notebook, an electronic handheld device, a personal digital assistant, a smart phone, a tablet computer, a net book, user devices, or the like. In one embodiment, computer system 105 comprises memory, storage and a processor such as a central processing unit that carry out the instructions of a computer program such as an operating system or portions of the present technology. Computer system 105 may also comprise a graphics processing unit (GPU) to process and render display features.

It should be appreciated that computer system 105 executing interface 110, plurality of components 115, components 120, 125, and 130, and controls 140 used to design application 135 comprise an instance of an application platform in accordance with the present technology. In one embodiment, the application platform may be used to as a tool for building applications in Delphi and C++ Builder for multiple operating systems. In one embodiment, the application platform is part of Firemonkey software products developed by Embarcadero Technologies. In one embodiment, computer system 105 comprises display that may be embedded, attached, coupled to, standalone, or separate from computer system 105. For example, a desktop computer system may have an independent monitor or screen whereas a smart phone has an embedded display. The display may be a liquid crystal display (LCD), a touch screen, a plasma screen, a projector, a cathode ray tube monitor, or any other electronic display. The display is capable of displaying interface 110, plurality of components 115, and application 135.

In one embodiment, interface 110 is a portion of the application platform and is a graphical user interface such that a developer may interact with graphical objects associated with interface 110 using standard input and output devices such as a keyboard, mouse, speakers, monitor, etc. The developer may employ a cursor to click and position objects within interface 110 such as components 120, 125, and 130 or the user may click on button associated with interface 110 such as buttons located within controls 140. It should be appreciated that interface 110 may comprise more than one of each of set of controls 140, plurality of components 115, and application 135. computer system 105 may also be capable of executing more than one instance of interface 110.

In one embodiment, plurality of components 115 comprises components 120, 125, and 130. Components 120, 125, and 130 may be, but are not limited to, a predefined visual object, an object, a graphic, text, a text field, an effect, a button, an animation, and a user interface control. For example, the application platform may comprise a library or database of components that may be used for creating an application. Predefined visual objects may be graphics that are used to create standard features in an application such as a menu. A developer may also use original or custom created components. Such components may be added to an existing plurality of components 115. Plurality of components 115 may display a variety of components or it may display menu options or drop down menus which comprise categories and subcategories of components. Such menu options may link to a display or list of available components. Components from plurality of components 115 may be selected by a developer and placed in application 135 during the design of application 135. For example, a developer may select component 120 which is a button to be used in a menu for application 135. The developer may click and position component 120 from plurality of components 115 to the portion of interface 110 representing application 135. In this example, the developer may visually position component 120 in an application using the graphical interface without requiring the developer to write code to place component 120 in position. The application platform may then operate to automatically compile code that will place component 120 in the position selected by the developer. The clicking and positioning may be performed using a mouse and a cursor associated with interface 110. Other means of selecting and placing a component may be employed.

In one embodiment, controls 140 may be employed to control features and parameters of application 135 and components selected for use in application 135. For example, component 120 may be a text field selected and placed within application 135. Component 120 may comprise default parameters such as text fonts, styles, size and colors. Controls 140 may be employed by the developer to alter the parameters of component 120. Other parameters of components may include a size of the component, a style of the component, a texture of the component, a color of the component, an effect of the component, a shape of the component, and an animation of the component. Controls 140 may also comprise buttons, drop down menus, and other options for control in designing and developing application 135. Controls 140 may also comprise controls for executing application 135 with limited functionality within interface 110 before application 135 is fully designed. Developing application 135 may comprise different stages and it may be useful for a developer to view or experience application 135 as a user will eventually experience application 135 before moving on to the next stage of development. For example, a developer may select an animation for application 135 and may wish to view the animation and how it looks and feels with other components of application 135 before moving on to the next stage. A developer then is able to make decisions based on the execution of the application with limited functionality. This process may be referred to as live design. Live design may be accomplished by partially compiling code for application 135 before it is fully developed, or the application platform may allow the partially completed application 135 to execute without compiling code. Live design also allows a developer to debug an application as it is being developed. Additionally, live design allows multiple versions of the application, designed for different operating systems, to be debugged as each version is created. Virtualization software may be employed within the application platform to virtually simulate different operating systems and platforms. A style file may be added to an application to change the style of the application without requiring the application to be re-compiled.

Application 135 is a software application designed using the application platform in accordance with embodiments of the present technology. Application 135 may be designed to run on a single type of device or a plurality of devices. In one embodiment, the application platform may create a plurality of versions of application 135 designed such that each version is tailored to execute or run on a different device with an associated platform and operating system. Such different version may be created automatically or under the direction of the developer. Thus a developer may employ the present technology to design a application to run on more than one type of device. In one embodiment, application 135 is designed to natively execute or run on a target processor associated with a computing platform. Such a native execution may occur using the target processor and target operating system without the use of a virtualization layer. For example, a virtual software layer may be a runtime interpreter such as Java. In one embodiment, application 135 may be designed to execute on a desktop computer running a Windows operating system or a smart phone running another operating system.

Figure 2:
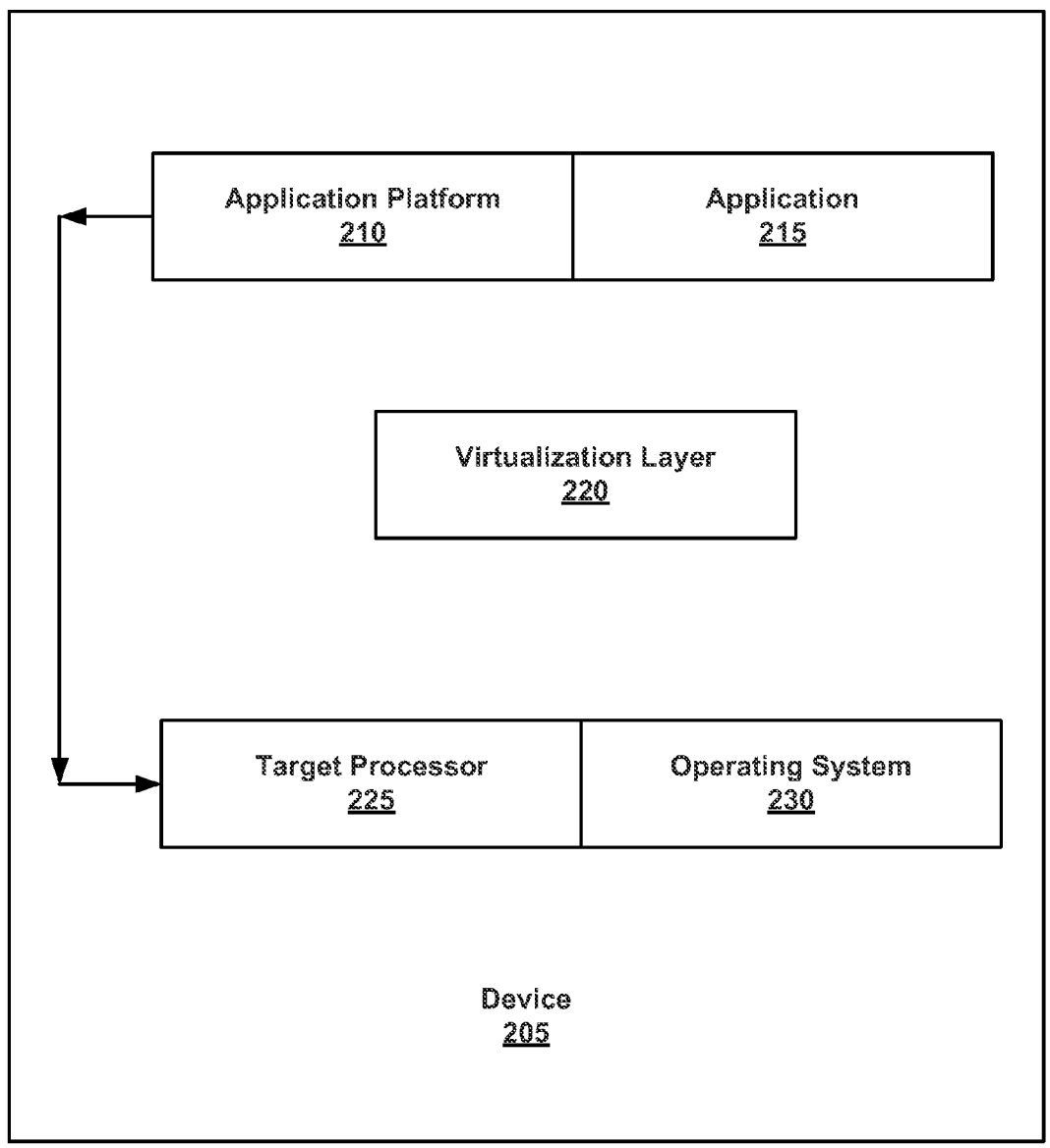
FIG. 2 is a block diagram of an environment employing an application platform for designing or executing an application in accordance with embodiments of the present technology.

FIG. 2 is a block diagram illustrating environment 200 which is an example environment comprising device 205, application platform 210, application 215, virtualization layer 220, target processor 225, and operating system 230 in accordance with embodiments of the present technology. Environment 100 depicts computer system 105 as a hardware device for carrying out the present technology. Device 205 may be a general purpose computer system, an embedded computer system, a personal computer such as a desktop computer, a laptop, a notebook, an electronic handheld device, a personal digital assistant, a smart phone, a tablet computer, a net book, user devices, or the like. In one embodiment, device 205 comprises memory, storage and a processor such as a central processing unit that carry out the instructions of a computer program such as an operating system or portions of the present technology. Device 205 may also comprise a graphics processing unit (GPU) to process and render display features.

Application platform 210 is an example an application platform in accordance with the present technology employed for designing and executing an application such as application 135 and application 215. Application platform 210 can be preinstalled on a end user device that will execute application 215 such as device 205. Application platform 215 may also be deployed with application 215 such that an end user may not realize that application platform 210 is installed on device 205. Virtualization layer 220 is a layer of software installed on device 205 that may be used to execute application other than application designed by an application platform. For example, virtualization layer 220 may be a runtime interpreter, Java, JITer, or the like. The present technology operates to by-pass virtualization layer 220 by tailoring application 215 to natively execute on target processor 225 and operating system 230 of device 205. By-passing virtualization layer 220 allows application 215 to run faster and more efficiently at the machine level. Target processor may be a CPU, a GPU, a processor based on the ARM processor, or the like. Operating system 230 may be any operating system designed to execute software application on a hardware computing device.

In one embodiment, application platform 215 can be adapted to different Graphical Processing Unit (GPU) libraries, such as DirectX and OpenGL, and it could be ported to many different operating systems. In one embodiment, a Delphi language compiler is required in the operating system executing application platform 215. The application platform may support Win32, Win64, Mac OSX, iOS, Android, and other platforms. The application platform also offers powerful high definition and 3D graphics, flexible styles, and support for rich Graphical User Interfaces (GUIs).

In one embodiment, the application processor is bound directly to native graphic libraries, like OpenGL or DirectX, offering high performance in terms of using the GPU or the CPU. In one embodiment, there is no need to distribute or install additional libraries on the target computer, as the application platform builds a single executable, which includes the code for the application and the required library code. This largely simplifies the deployment, compared to other similar solutions.

The application platform employs a rich user interface that employs a Vector User Interface (UI) to render visual features in the app. In one embodiment, the features are rendered at runtime on the end user device. In one embodiment, the application platform is not reliant on libraries associated with the platform the app is running on. In one embodiment, bitmaps are not required to render and display the visuals associated with the app. In one embodiment, the application platform employs a Bitmap User Interface. The application platform creates visual effects such as highlights or changes to visual objects during an event like a mouse over or mouse hover. The application platform can be used for 2D and 3D visual effects including animation. The application platform can display 2D images on 2D images, 2D images on 3D images, and 3D images on 2D images.

Visual look and feel may be developed to look and feel the same across multiple platforms. Such that features are rendered by the application platform during runtime of the application. In one embodiment, the look and feel of the application may be developed to mimic the standard buttons or other features and objects that are standard in a given platform. This may be accomplished by the application platform automatically upon receiving a command to compile the application for a given operating system or platform. For example, windows operating system may have a standard radio button that is employed by dialogue box. The present technology may mimic such a button by recreating the button and rendering it at runtime. In one embodiment, the button or other feature is received by the application from the platform and uses the libraries of the platform to do so.

In one embodiment, the features are rendered during runtime such that a bitmap image is not required thus eliminating the requirement for a bitmap library to be used by the application during runtime. Such a feature saves storage space and allows the overall size of the application to be smaller and take up less space on the device. In one embodiment, the application may be developed to use a limited number of bitmaps rendered specifically for the application.

The application platform can be used during the run time of an application. The application platform may serve to render visual objects, effects and animations during the executing or run time of an application. Such rendering allows the application to run native on the hardware of the device running the application which allows the application to run or execute faster than an application dependent on a virtual layer of software such as java. Additionally, the rendering allows for a reduction of images and libraries that need to be stored on the device for use by the application. Thus the application will take up less space than an application reliant on more images and less rendering. Moreover, by rendering the visuals, effects and animations during runtime, the application is allowed a great deal of combinations of effects to display. Because of the rendering during run time, such visuals, effects, and animations may have layers of complexity without requiring additional layers of images or libraries.

Operations

Figure 3:
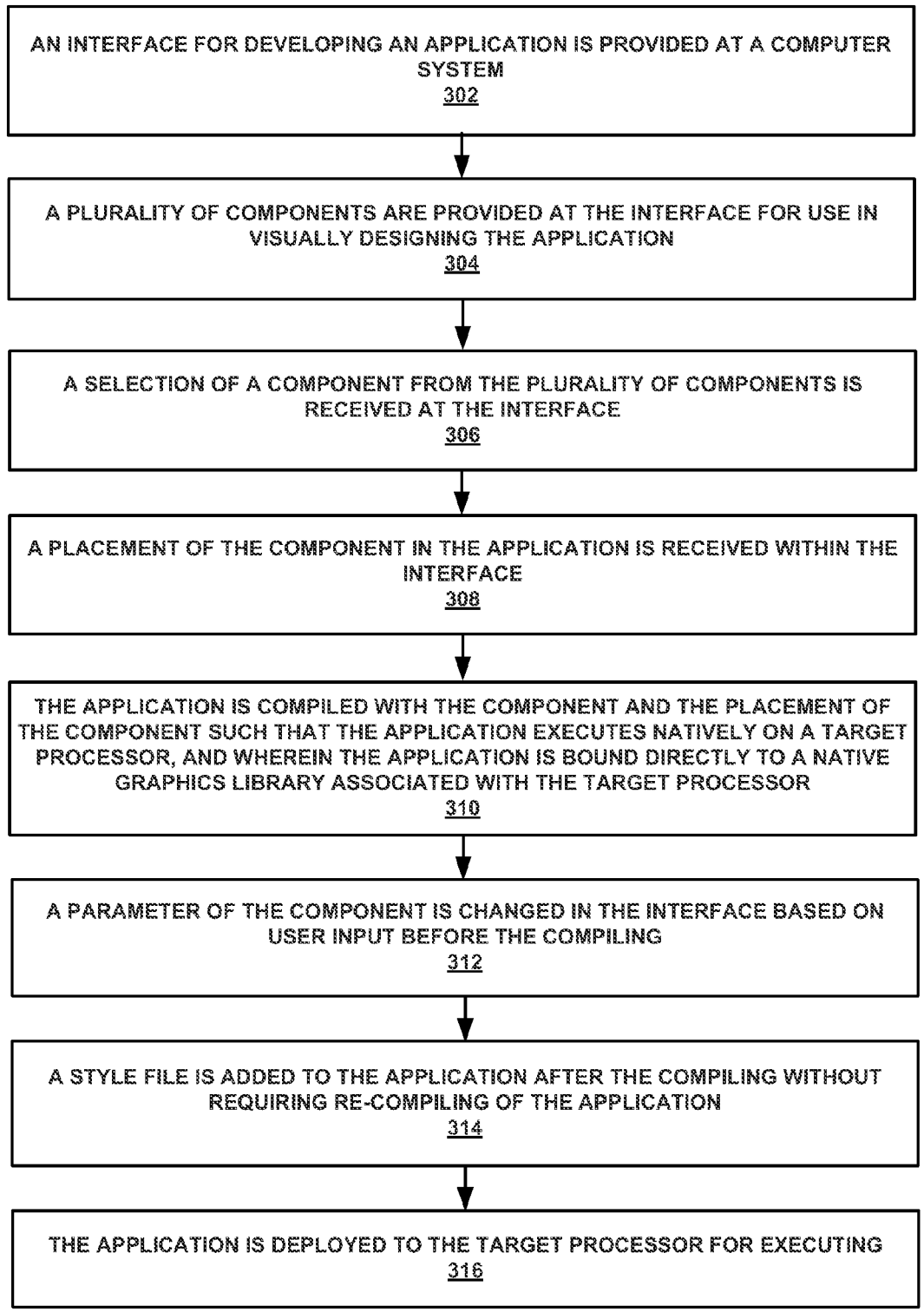
FIG. 3 illustrates a flowchart of an example method for using an application platform to design an application, in accordance with embodiments of the present technology.

FIG. 3 is a flowchart illustrating process 300 for using an application platform to design an application, in accordance with one embodiment of the present invention. In one embodiment, process 300 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 300 is performed by devices, platforms and interfaces in FIGS. 1 and 2. Process 300 may be described as design time for designing an application in an application platform associated with the present technology.

At 302, an interface for developing an application is provided at a computer system. The interface may be interface 110 of FIG. 1 and is part of the application platform.

At 304, a plurality of components are provided at the interface for use in visually designing the application. The plurality of components may be plurality of components 115 of FIG. 1 and are part of the application platform.

At 306, a selection of a component from the plurality of components is received at the interface. The component may be components 120, 125, and 130 of FIG. 1.

At 308, a placement of the component in the application is received within the interface. The application may be application 135 of FIG. 1.

At 310, the application is compiled with the component and the placement of the component such that the application executes natively on a target processor, and wherein the application is bound directly to a native graphics library associated with the target processor.

At 312, a parameter of the component is changed in the interface based on user input before the compiling.

At 314, a style file is added to the application to change the look of the user interface after the compiling without requiring re-compiling of the application.

At 316, the application is deployed to the target processor with the application platform for executing.

Figure 4:
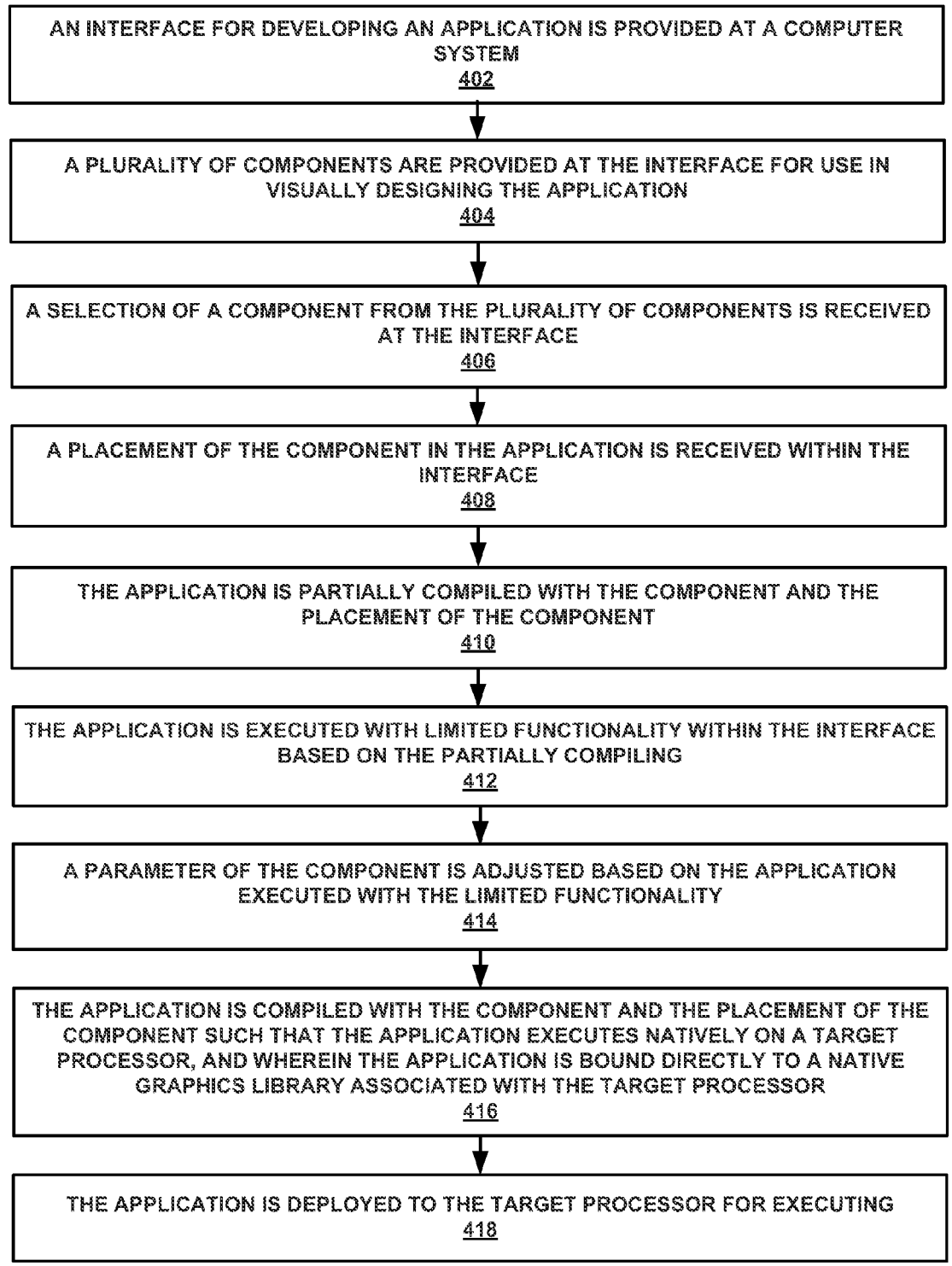
FIG. 4 illustrates a flowchart of an example method for using an application platform to design an application, in accordance with embodiments of the present technology.

FIG. 4 is a flowchart illustrating process 400 for using an application platform to design an application, in accordance with one embodiment of the present invention. In one embodiment, process 400 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 400 is performed by devices, platforms and interfaces in FIGS. 1 and 2. Process 400 may be described as design time for designing an application in an application platform associated with the present technology.

At 402, an interface for developing an application is provided at a computer system. The interface may be interface 110 of FIG. 1 and is part of the application platform.

At 404, a plurality of components are provided at the interface for use in visually designing the application. The plurality of components may be plurality of components 115 of FIG. 1 and are part of the application platform.

At 406, a selection of a component from the plurality of components is received at the interface. The component may be components 120, 125, and 130 of FIG. 1.

At 408, a placement of the component in the application is received within the interface. The application may be application 135 of FIG. 1.

At 410, the application is partially compiled with the component and the placement of the component.

At 412, the application is executed with limited functionality within the interface based on the partially compiling.

At 414, a parameter of the component is adjusted based on the application executed with the limited functionality.

At 416, the application is compiled with the component and the placement of the component such that the application executes natively on a target processor, and wherein the application is bound directly to a native graphics library associated with the target processor.

At 418, the application is deployed to the target processor for executing.

FIG. 5 is a flowchart illustrating process 500 for executing an application, in accordance with one embodiment of the present invention. In one embodiment, process 500 is carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 500 is performed by devices, platforms and interfaces in FIGS. 1 and 2. Process 500 may be described as run time for executing an application designed by an application platform associated with the present technology.

At 502, application is received at a device designed to execute natively at a processor associated with the device wherein the application was designed in an interface with at least one component of the application selected from a plurality of components at the interface.

At 504, the application is executed at the device.

At 506, at least partially rendering a feature of the application during the execution the application.

While the technology is described in some detail with specific reference to embodiments and alternatives, there is no intent to limit the technology to a particular embodiment or specific alternatives. For instance, those skilled in the art will appreciate that modifications may be made to embodiments without departing from the teachings of the present technology.

Example Computer System Environment

The present technology may be carried out, associated with or otherwise practiced with a computer system. Portions of the present technology are composed of computer-readable and computer-executable instructions that reside, for example, in computer-usable media of a computer system or other user device such as computer system 105 of FIG. 1 and device 205 of FIG. 2. Described below is an example computer system or components that may be used for or in conjunction with aspects of the present technology such as an application platform for designing and executing an application.

It is appreciated that that the present technology can operate on or within a number of different computer systems including general purpose networked computer systems, embedded computer systems, a personal computer such as a desktop computer, a laptop, a notebook, an electronic hand-held device, a personal digital assistant, a smart phone, a tablet computer, a net book, user devices, and the like. The computer system is well adapted to having peripheral computer readable media such as, for example, a floppy disk, a compact disc, flash memory and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smart phone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-usable storage medium having instructions embodied therein that when executed cause a computer system to perform a method for using an application platform to design an application, said method comprising:

providing an interface on an operating system for developing an application at a computer system;

providing a plurality of components at said interface for use in visually designing said application;

receiving a selection of a component from said plurality of components at said interface;

receiving a placement of said component in said application within said interface;

partially compiling said application in said interface during design time with said component and said placement of said component to generate a partially compiled application;

receiving a style selection for said component of said partially compiled application, wherein said style selection modifies an appearance of said component;

executing said partially compiled application comprising said style selection with limited functionality within said interface during said design time based on said partially compiling such that said component rendered according to said style selection without requiring said partially compiled application to be re-partially compiled; and compiling said application at said operating system automatically into a plurality of versions for a plurality of platforms each to execute on different operating systems with said component and said placement of said component, without requiring a developer to write code for said placement, such that said plurality of versions of said application execute natively on each target graphics processing unit (GPU) for each version of said plurality of versions without requiring a virtual layer of software at runtime, wherein said application is bound directly to a native graphics library associated with said target GPU, and wherein each version of said application is compiled into one executable binary file.

2. The non-transitory computer-usable storage medium of claim 1, said method further comprising:

changing a parameter of said component in said interface based on user input before said compiling.

3. The non-transitory computer-usable storage medium of claim 2 wherein said parameter is selected from the group of parameters consisting of: a size of said component, a style of said component, a texture of said component, a color of said component, an effect of said component, a shape of said component, and an animation of said component.

4. The non-transitory computer-usable storage medium of claim 1 wherein said component is selected from the group of components consisting of: a predefined visual object, an object, a graphic, text, a text field, an effect, a button, an animation, and a user interface control.

5. The non-transitory computer-usable storage medium of claim 1, said method further comprising:

deploying said application with said application platform to said target GPU for executing.

6. The non-transitory computer-usable storage medium of claim 1 wherein said application is compiled with a static library that is loaded with said application upon deployment of said application such that no additional library is required at said target GPU.

7. The non-transitory computer-usable storage medium of claim 1 wherein said application is compiled with a dynamic library wherein portions of said dynamic library are loaded as needed during deployment of said application.

8. The non-transitory computer-usable storage medium of claim 1, said method further comprising:

adding a style file to said application after said compiling without requiring re-compiling of said application.

9. A non-transitory computer-usable storage medium having instructions embodied therein that when executed cause a computer system to perform a method for using an application platform to design an application, said method comprising:

providing an interface for developing an application at a computer system;

providing a plurality of components at said interface for use in visually designing said application;

receiving a selection of a component from said plurality of components at said interface;

receiving a placement of said component in said application within said interface;

receiving an animation of said component, wherein said animation modifies an appearance of said component over time responsive to an event during execution of said application;

partially compiling said application in said interface during design time before said application is fully designed with said component and said placement of said component to generate a partially compiled application, wherein said application, upon completion, is to be automatically compiled into a plurality of versions for a plurality of platforms each to execute on different operating systems with said component and said placement of said component, without requiring a developer to write code for said placement, executed by an operating system for a mobile device;

executing said partially compiled application with limited functionality within said interface during said design time based on said partially compiling without requiring code for said application to be fully compiled into one executable binary file;

receiving changes to said application based on said partially compiling and said executing, said changes comprising a style selection for said component of said partially compiled application, wherein said style selection modifies said appearance of said component;

executing said partially compiled application comprising said style selection with limited functionality within said interface during said design time based on said partially compiling such that said component rendered according to said style selection without requiring said partially compiled application to be re-partially compiled; and compiling said application with said component and said placement of said component such that said application executes natively on a target graphics processing unit (GPU), and wherein said application is bound directly to a native graphics library associated with said target GPU, and wherein each version of said application is compiled into one executable binary file.

10. The non-transitory computer-usable storage medium of claim 9, said method further comprising:

adjusting a parameter of said component based on said executing said application with said limited functionality.

11. The non-transitory computer-usable storage medium of claim 10 wherein said partially compiling said application and said executing said application with limited functionality are repeated based on said adjusting said parameter of said component.

12. The non-transitory computer-usable storage medium of claim 10 wherein said parameter is selected from the group of parameters consisting of: a size of said component, a style of said component, a texture of said component, a color of said component, an effect of said component, a shape of said component, and an animation of said component.

13. The non-transitory computer-usable storage medium of claim 9 wherein said component is selected from the group of components consisting of: a predefined visual object, an object, a graphic, text, a text field, an effect, a button, an animation, and a user interface control.

14. The non-transitory computer-usable storage medium of claim 9 wherein said compiling said application compiles a plurality of versions of said application to execute on a plurality of platforms.

15. The non-transitory computer-usable storage medium of claim 9, said method further comprising:
deploying said application with said application platform to said target GPU for executing.

16. A non-transitory computer-usable storage medium having instructions embodied therein that when executed cause a computer system to perform a method for executing an application, said method comprising:
receiving an application at a mobile device designed to execute natively at a graphics processing unit (GPU) and a mobile operating system associated with said mobile device wherein said application was designed and automatically compiled into a single executable binary file in an interface executing on an operating system different from said mobile operating system with at least one component of said application selected from a plurality of components at said interface, said at least one component comprising a style selection that modifies an appearance of said component and an animation that modifies an appearance of said component over time responsive to an event during execution of said application, wherein said automatically compiled is based on a placement of said at least one component in said interface, said animation and said style selection, without requiring a developer to write code for said placement, said animation and said style selection;
executing said application at said mobile device; and
rendering said component of said application during said executing said application, said rendering comprising:
applying said style to said component; and
responsive to detecting said event, applying said animation to said component.

17. The non-transitory computer-usable storage medium of claim 16 wherein said rendering said component is accomplished such that said executing said application occurs without requiring a virtual layer of software at said mobile device.

18. The non-transitory computer-usable storage medium of claim 16 wherein said component is selected from the group of components consisting of: a rich user interface, a predefined visual object, an object, a graphic, text, a text field, an effect, a button, an animation, and a user interface control.

19. The non-transitory computer-usable storage medium of claim 16 wherein a platform used for designing the application is executed as part of the application.

* * * * *